Nov. 25, 1924.
E. D. KNIFFEN
1,517,009
EYEGLASSES
Filed Oct. 9, 1922   2 Sheets-Sheet 1
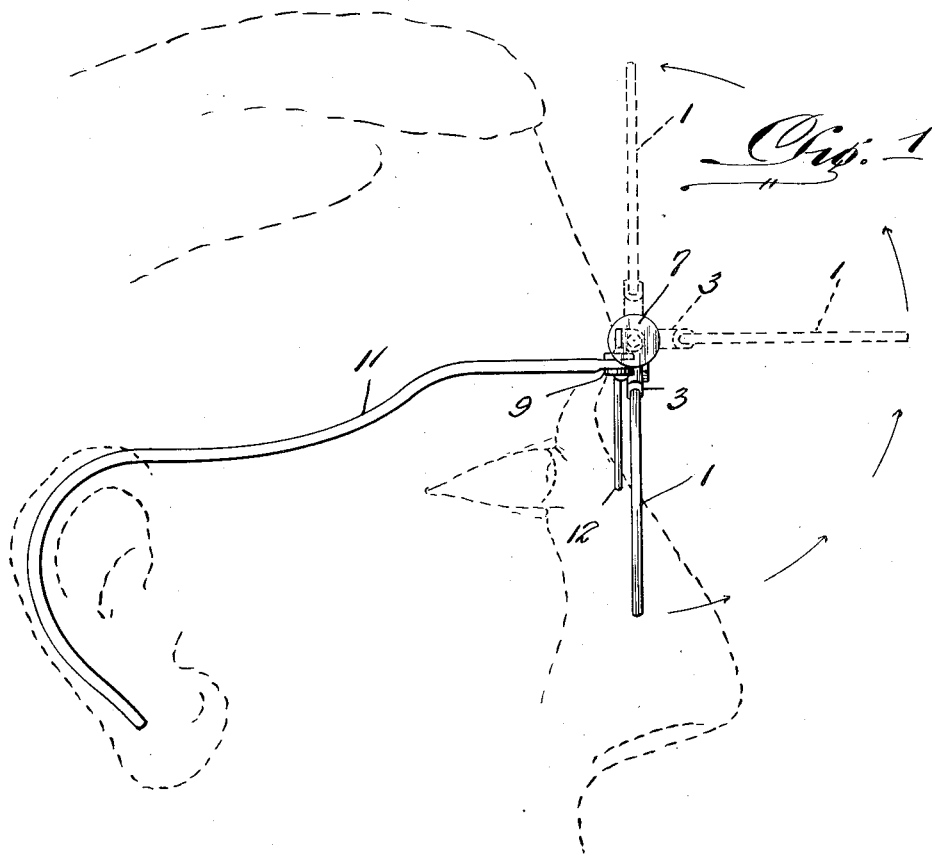
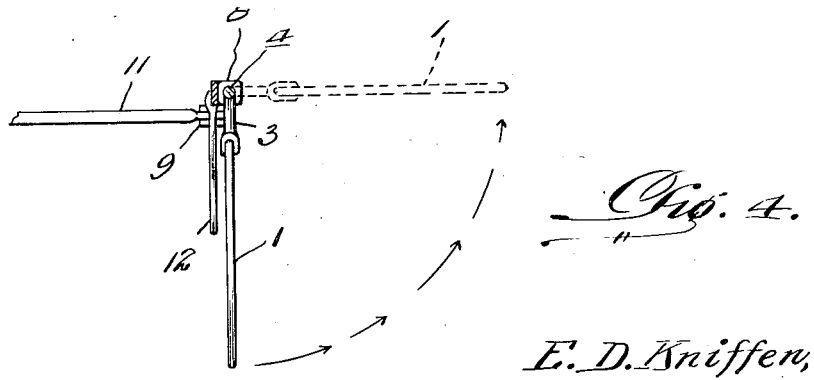
WITNESSES
E. D. Kniffen,
INVENTOR.
BY
ATTORNEYS.

Nov. 25, 1924.

E. D. KNIFFEN

EYEGLASSES

Filed Oct. 9, 1922

WITNESSES

E. D. Kniffen,
INVENTOR.
ATTORNEYS.

Patented Nov. 25, 1924.

1,517,009

UNITED STATES PATENT OFFICE.

ELLIOTT D. KNIFFEN, OF BROOKLYN, NEW YORK.

EYEGLASSES.

Application filed October 9, 1922. Serial No. 593,384.

*To all whom it may concern:*

Be it known that I, ELLIOTT D. KNIFFEN, a citizen of the United States, residing at Brooklyn, in the county of Kings and State of New York, have invented certain new and useful Improvements in Eyeglasses, of which the following is a specification.

This invention has relation to eye glasses, and the primary object thereof resides in the provision of such an article of manufacture, wherein the lens members are so supported as to have a relative swinging movement upon their support for conveniently swinging the same out of the line of vision of the wearer without the usual practice of entirely removing the glasses from the face.

A further object of the invention is the provision of an article of the above nature, wherein the spaced lens members are so supported as to have a swinging movement upon their support and to be retained in any one of a plurality of predetermined positions, the means for accomplishing this result being comparatively inexpensive of manufacture and simple of operation.

With the above and other objects in view as the nature of the invention will be better understood by reference to the accompanying drawings, forming part of the present application, the same consists of the combination and arrangement of parts hereinafter more fully described.

In the accompanying drawings, wherein like reference characters indicate corresponding parts throughout the several views:—

Figure 1 is a side elevational view of a pair of eye glasses constructed in accordance with the present invention, the lens members being shown by dotted lines in several set positions and further, these glasses being disclosed as supported in position upon the face of the wearer.

Figure 4 is a cross sectional view upon the line of 4—4 of Figure 2, looking in the direction of the arrows.

Figure 2:
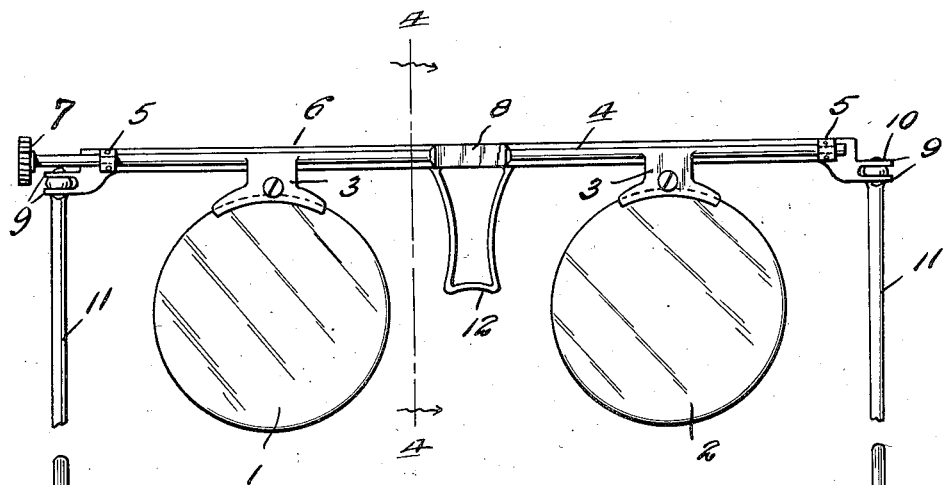
Figure 2 is a fragmentary front elevational view of the device shown in Figure 1.
Figure 3:
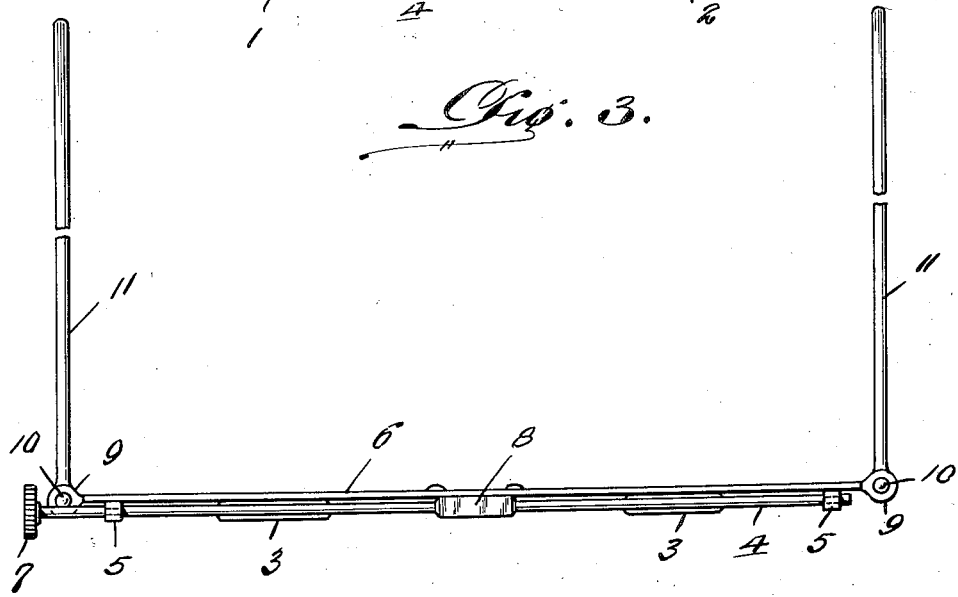
Figure 3 is a top plan view thereof.

Having particular reference to the several views, there is shown a pair of eye glasses comprising suitably spaced lens members 1 and 2 conveniently supported by the brackets 3 formed upon a longitudinally extending annular shaped rod 4, these bracket members being a part of the said rod. The opposite ends of the rod 4 are rotatably supported in bearings 5 carried by a longitudinally extending flat-like strip 6, one of the outer ends of this rod having a knurled thumb wheel 7 for rotating the rod within the bearings.

Substantially intermediate the opposite ends of the rod 4, there is formed an enlarged square shaped portion 8 for presenting a flat engaging face to the adjacent face of the supporting member 6, for purposes hereinafter described.

Formed upon the free ends of the supporting strip 6 are spaced finger members 9 for pivotally receiving therebetween by a pivot pin 10, the flat and eyed end of the side ear engaging wires 11. Intermediate the lens members 1 and 2, there is formed upon the supporting strip 6 a depending nose engaging support 12 for conveniently supporting the glasses upon the nose of the wearer as in Figure 1.

From the above description, the operation and advantages of the device will be readily apparent, and the normal position of the spaced lens members 1 and 2 is as shown in the full line position of several of the figures, in which position, the glasses may be conveniently applied to the face of the wearer for known purposes. Should occasion arise however, at any time, to extend the said lens members to a position either totally or partially out of the line of vision of the wearer, all that is necessary is to impart by means of the knurled thumb piece 7, a rotary motion to the horizontal bar 4, the nature of this bar being such as to allow a relative outward spring movement thereof between its opposite ends in view of the enlarged squared central portion 8 of this rod.

By imparting a one-fourth turn to the rod one of the edges of the squared portion 8, will frictionally engage with the adjacent face of the supporting strip 6, necessarily spring the rod 4 outwardly until this edge has passed over the surface of the strip 6 at which time, the pair lens 1 and 2 will be effectively retained in the central dotted line position of Figure 1. An additional one-fourth turn to the rod 4 in the same direction will extend the lens members 1 and 2 to a vertical position to be there retained by the said enlarged squared portion 4 as in Figure 1.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

An article of the class described comprising a flexible bridge strip, a pair of temples pivotally connected to opposite ends of said bridge strip, a rod rotatably mounted in bearings on the end portions of said bridge strip and having an enlarged central portion of rectangular section, the faces of which are adapted to engage the central portion of the bridge strip, a nose engaging support depending from the central portion of said bridge strip, for supporting said strip in proximity to the eye brows of a wearer, and a pair of lenses mounted in spaced relation on said rod adapted for movement therewith, whereby the bearing connections of the rod at the ends of the bridge strip will cause a cooperation between the rectangular section and said strip, in the central portion thereof, in order that the resiliency of the strip will operate to effect a holding of the lenses in one of a plurality of adjusted positions.

In testimony whereof I affix my signature.

ELLIOTT D. KNIFFEN.